United States Patent
Park et al.

(10) Patent No.: US 10,511,368 B2
(45) Date of Patent: Dec. 17, 2019

(54) METHOD OF TRANSMITTING AND RECEIVING SIGNAL IN WIRELESS COMMUNICATION SYSTEM AND APPARATUS THEREFOR

(71) Applicant: LG ELECTRONICS INC., Seoul (KR)

(72) Inventors: Sungjin Park, Seoul (KR); Jinmin Kim, Seoul (KR); Hangyu Cho, Seoul (KR); Kyungtae Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 15/655,290

(22) Filed: Jul. 20, 2017

(65) Prior Publication Data

US 2018/0026691 A1     Jan. 25, 2018

Related U.S. Application Data

(60) Provisional application No. 62/364,873, filed on Jul. 21, 2016.

(51) Int. Cl.
| | |
|---|---|
| *H04B 7/06* | (2006.01) |
| *H04W 72/04* | (2009.01) |
| *H04B 7/08* | (2006.01) |
| *H04L 5/00* | (2006.01) |
| *H04W 74/00* | (2009.01) |
| *H04L 29/06* | (2006.01) |
| *H04W 84/12* | (2009.01) |

(52) U.S. Cl.
CPC ......... *H04B 7/0615* (2013.01); *H04B 7/0695* (2013.01); *H04B 7/088* (2013.01); *H04L 5/0023* (2013.01); *H04L 5/0048* (2013.01); *H04W 72/0446* (2013.01); *H04L 5/0012* (2013.01); *H04L 69/161* (2013.01); *H04W 74/004* (2013.01); *H04W 74/006* (2013.01); *H04W 84/12* (2013.01)

(58) Field of Classification Search
CPC .................................................... H04B 7/0615
See application file for complete search history.

(56) References Cited

U.S. PATENT DOCUMENTS

| | | | |
|---|---|---|---|
| 9,450,743 B1 * | 9/2016 | Chu | H04L 69/22 |
| 10,182,361 B1 * | 1/2019 | Moon | H04W 24/08 |
| 2006/0182017 A1 * | 8/2006 | Hansen | H04B 7/02 370/208 |
| 2011/0026639 A1 * | 2/2011 | Rouquette-Leveil | H04B 7/0671 375/298 |

(Continued)

*Primary Examiner* — Andrew Lai
*Assistant Examiner* — Andrew C Lee
(74) *Attorney, Agent, or Firm* — Dentons US LLP

(57) ABSTRACT

A method of transmitting and receiving a signal, which is transmitted by a station in a wireless communication system, is disclosed in the present specification. The method can include the steps of receiving a PPDU and performing beamforming training based on a TRN field of the received PPDU. In this case, a training length field belonging to an L-header field of the PPDU indicates a length of the TRN field from the timing at which the PPDU ends in reverse order and a length field belonging to the L-header field of the PPDU can indicate a length resulted from subtracting the length of the TRN field indicated by the training length field from a length of the PPDU after the L-header field.

13 Claims, 12 Drawing Sheets

(56) References Cited

U.S. PATENT DOCUMENTS

| | | | |
|---|---|---|---|
| 2012/0294255 A1* | 11/2012 | Seok | H04B 7/0452 370/329 |
| 2016/0295513 A1* | 10/2016 | Moon | H04L 5/0023 |
| 2016/0323861 A1* | 11/2016 | Cordeiro | H04B 7/0452 |
| 2016/0323878 A1* | 11/2016 | Ghosh | H04W 72/0446 |
| 2016/0329986 A1* | 11/2016 | Eitan | H04L 1/0011 |
| 2016/0359653 A1* | 12/2016 | Lee | H04L 27/2613 |
| 2017/0078008 A1* | 3/2017 | Kasher | H04B 7/0617 |
| 2017/0079031 A1* | 3/2017 | Maltsev, Jr. | H04B 7/0491 |
| 2017/0202011 A1* | 7/2017 | Trainin | H04W 52/0216 |
| 2017/0338927 A1* | 11/2017 | Park | H04L 27/26 |

* cited by examiner

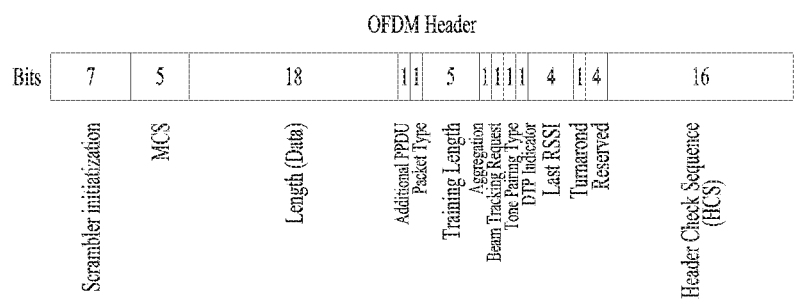

FIG. 11
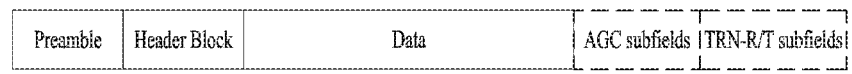
Control PHY frames
(a)
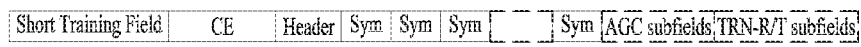
OFDM frame format
(b)
SC frame format
(c)

METHOD OF TRANSMITTING AND RECEIVING SIGNAL IN WIRELESS COMMUNICATION SYSTEM AND APPARATUS THEREFOR

Pursuant to 35 U.S.C. § 119(e), this application claims the benefit of the U.S. Provisional Application No. 62/364,873, filed on Jul. 21, 2016, which is hereby incorporated by reference as if fully set forth herein.

BACKGROUND OF THE INVENTION

Field of the Invention

The present invention relates to a method of transmitting and receiving a signal in a wireless communication system and an apparatus therefor. In particular, the present invention relates to a method of operating a station (STA) in a wireless LAN (WLAN) system, and more particularly, to a method of configuring information indicating a length of a TRN (training) field of a PPDU (physical protocol data unit) transmitted by a station in a wireless LAN system and an apparatus therefor.

Discussion of the Related Art

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

SUMMARY OF THE INVENTION

Accordingly, the present invention is directed to an apparatus and method thereof that substantially obviate one or more problems due to limitations and disadvantages of the related art.

A technical task of the present invention is to provide a method for an STA to transmit and receive a signal in a wireless communication system.

Another technical task of the present invention is to provide a method of configuring information included in a PPDU transmitted by an STA.

The other technical task of the present invention is to provide a method of configuring information included in a PPDU in consideration of backward compatibility with a legacy system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with one embodiment of the present specification, a method of transmitting and receiving a signal by a station (STA) in a wireless communication system, the method comprising: receiving a PPDU (physical protocol data unit); and performing beamforming training based on a TRN (training) field of the received PPDU, wherein a training length field included in an L-header (legacy header) field of the PPDU indicates a length of the TRN field from the end of the PPDU in reverse order, and wherein a length field included in the L-header field of the PPDU indicates a length obtained by subtracting the length of the TRN field indicated by the training length field from a length of the PPDU after the L-header field.

In accordance with one embodiment of the present specification, a station (STA) transmitting and receiving a signal in a wireless communication system, comprising: a transceiving unit having one or more RF (radio frequency) chains and transmitting and receiving a signal, and a processor configured to control the transceiving unit, wherein the processor is further configured to receive a PPDU (physical protocol data unit) using the transceiving unit, and perform beamforming training based on a TRN (training) field of the received PPDU, wherein a training length field included in a L-header (legacy header) field of the PPDU indicates a length of the TRN field from the end of the PPDU in reverse order, and wherein a length field included in the L-header field of the PPDU indicates a length obtained by subtracting the length of the TRN field indicated by the training length field from a length of the PPDU after the L-header field.

Also, the followings may commonly be applied to the method and apparatus for transmitting and receiving a signal in a wireless communication system.

In accordance with one embodiment of the present specification, the STA corresponds to an STA operating based on a first system only.

In accordance with one embodiment of the present specification, the PPDU further comprises an EDMG (enhanced directional multi-gigabit) header field.

In accordance with one embodiment of the present specification, the length of the TRN field is indicated by the training length field and an extended training length field included in the EDMG header field when the length of the TRN field is longer than a limit length capable of being indicated by the training length field.

In accordance with one embodiment of the present specification, the extended training length field included in the EDMG header field indicates the remaining length among the length of the TRN field indicated from the end of PPDU in reverse order.

In accordance with one embodiment of the present specification, the EDMG header field corresponds to a field including information related to the first system, and the L-header field corresponds to a field including information related to a legacy system.

In accordance with one embodiment of the present specification, the training length field indicates the length of the TRN field and the length field indicates a length of a data field of the PPDU when the STA corresponds to an STA not supporting the first system.

In accordance with one embodiment of the present specification, the first system corresponds to IEEE 802.11ay system.

To achieve these objects and other advantages and in accordance with the purpose of the invention, as embodied and broadly described herein, according to one embodiment, And, the following items can be commonly applied to a method of eliminating interference in a wireless communication system and an apparatus therefor.

To achieve these objects and other advantages and in accordance with the purpose of the invention, as embodied and broadly described herein, according to one embodiment, According to the present invention, it is able to provide a method for an STA to transmit and receive a signal in a wireless communication system.

According to the present invention, it is able to provide a method of configuring information included in a PPDU transmitted by an STA.

According to the present invention, it is able to provide a method of configuring information included in a PPDU in consideration of backward compatibility with a legacy system.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 7 and 8 are diagrams illustrating configuration of the header field of the radio frame of FIG. 6;

FIG. 9 is a diagram showing a PPDU structure applicable to the present invention;

FIG. 11 is a diagram for a frame format used for transmitting data in 11ad system;

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System

2. Generals of WLAN System

Figure 1:
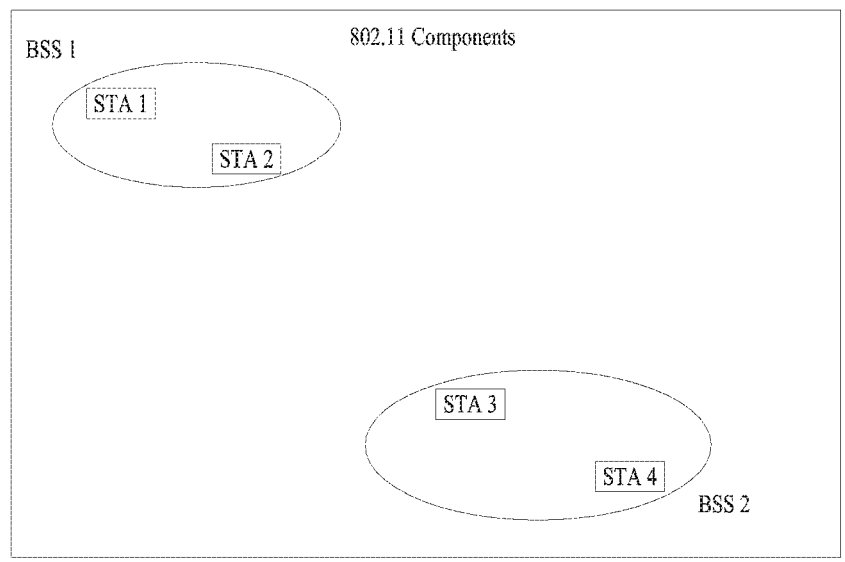
FIG. 1 is a diagram illustrating an exemplary configuration of a Wireless Local Area Network (WLAN) system.

FIG. 1 is a diagram illustrating an exemplary configuration of a WLAN system. As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
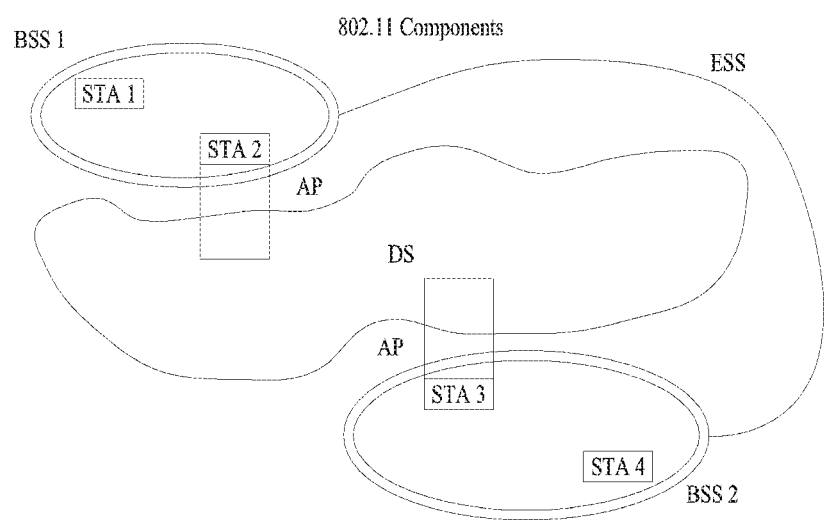
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2. Channel Bonding in WLAN System

Figure 3:
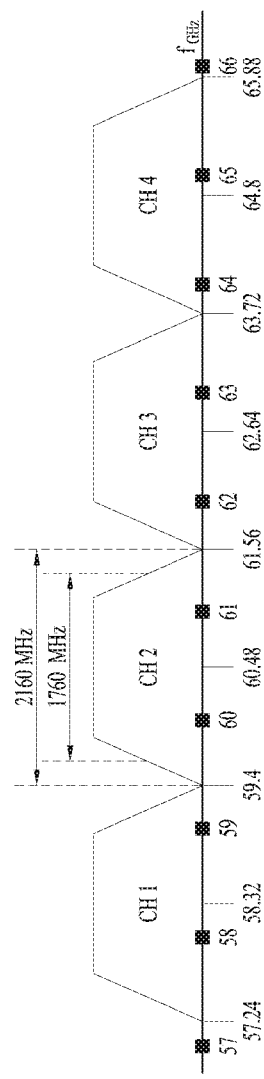
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
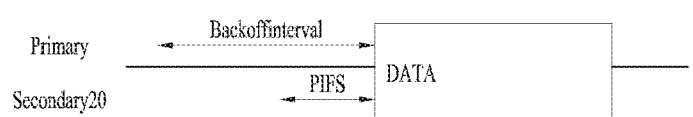
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
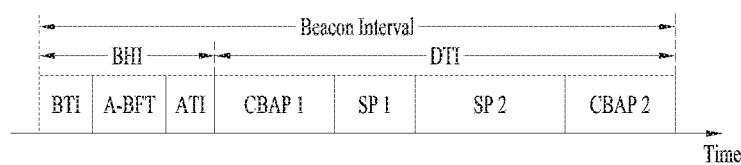
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
|---|---|---|
| Control PHY | 0 | |
| Single carrier PHY (SC PHY) | 1 ... 12<br>25 ... 31 | (low power SC PHY) |
| OFDM PHY | 13 ... 24 | |

Such modulation modes may be used to satisfy different requirements (e.g., high throughput or stability). Depending on the system, only some of these modes may be supported.

Figure 6:
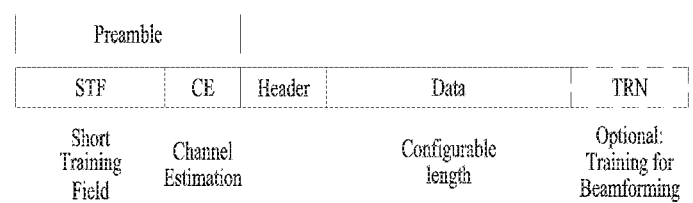
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
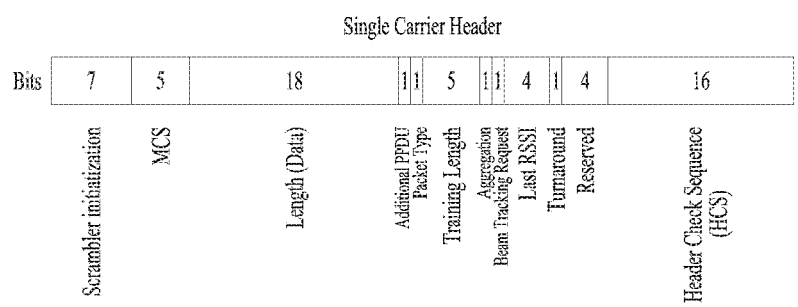

FIGS. 7 and 8 are diagrams illustrating configuration of the header field of the radio frame of FIG. 6.

Specifically, FIG. 7 illustrates a case where a Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam training request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam training request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

2. TRN Field Configuration

As mentioned in the foregoing description, a TRN field can be configured for beamforming in 11ad system. More specifically, when a PPDU is transmitted, an STA can attach AGC subfields and TRN-R/T subfields to the end of the PPDU for beam refinement and beam tracking. For example, an AGC subfield can be included in consideration of a change of an AWV (antenna weight vector). And, a TRN-T subfield can be used to more delicately perform TX beamforming. A TRN-R subfield can be used to perform not only TX beamforming but also RX beamforming. In this case, beamforming training for both TX and RX can be more delicately performed by attaching both the TRN-T and the TRN-R to a PPDU, by which the present invention may be non-limited. In this case, the TRN field may correspond to a concept including both AGC fields and TRN-R/T subfields.

Figure 10:
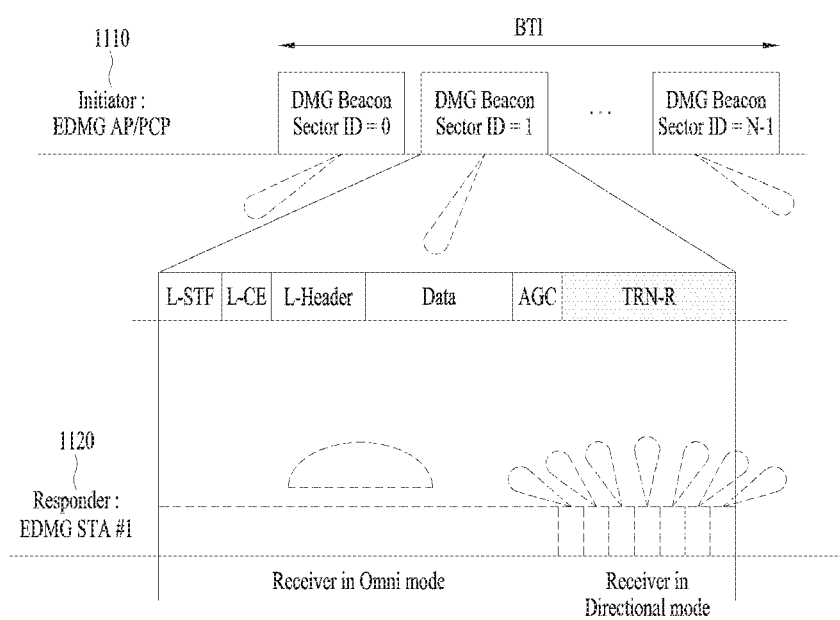
FIG. 10 is a diagram for a configuration of a TRN field.

FIG. 10 shows an example of configuring the TRN field. In this case, as an example, an initiator EDMG AP/PCP (Enhanced directional multi-gigabit Access point/personal basic service set (PBSS) control point) 1110 can transmit a beacon frame to a responder EDMG STA 1120 during BTI (beacon transmission interval). In this case, a format of the beacon frame can include an L-STF (Legacy Short Training Field), an L-CE (Legacy Channel Estimation), an L-Header, and a data field in consideration of backward compatibility with a legacy system (i.e., hay system). And, it may be able to include an AGC field and a TRN-T/R field as the aforementioned TRN field. In this case, for example, if the TRN-R field is included in the beacon frame, the responder RDMG STA 1120 can perform beamforming training in a directional mode during the TRN-R field. In particular, as mentioned in the foregoing description, the responder EDMG STA 1120 can perform coordination for beamforming in the TRN-R field.

3. Method of Indicating TRN Field Length Applicable to the Present Invention

As mentioned in the foregoing description, the TRN field can be used for beamforming training. In 11ay system, since it is able to transmit data using a plurality of channels, when a frame is transmitted using a scheme such as channel boding, channel aggregation, OFDMA, or the like, it is necessary to use a TRN field corresponding to a bandwidth occupied by payload which is decoded by a receiver or a TRN field corresponding to a bandwidth occupied by EDMG STF or EDMG CE. By doing so, it may be able to perform beam refinement and beam tracking optimized for a channel corresponding to a bandwidth currently used by the 11ay system capable of using a plurality of channels. In this case, when a frame is transmitted using a plurality of channels at the same time, a TRN field can be configured in various ways. In this case, a legacy header or an EDMG header may indicate a bandwidth on which a TRN field is transmitted, by which the present invention may be non-limited.

In this case, as mentioned in the foregoing description, since the 11ay system uses a plurality of channels, it is necessary to have more information to perform beamforming training compared to a case of using a single channel. Hence, a length of a TRN field can be extended compared to a TRN field of a legacy 11ad system.

For example, FIGS. 11 (a) to (c) show frame formats used for transmitting data in 11ad system. In this case, as mentioned in the foregoing description, the aforementioned TRN fields can be included in the latter part of a frame to perform beamforming training. In this case, a header field of the frame can indicate information related to the TRN fields.

Figure 12:
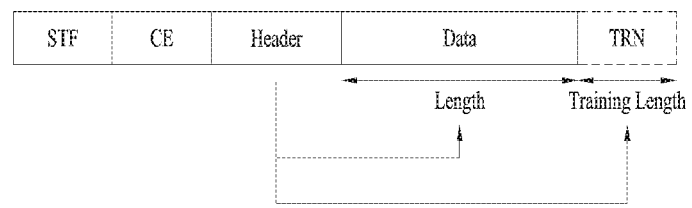
FIG. 12 is a diagram for a method of indicating a length of a legacy TRN field.

More specifically, FIG. 12 is a diagram for a method of indicating a length of a legacy TRN field. Referring to FIG. 12, in a legacy 11ad system, a header field can include a length field and a training length field as a subfield. In this case, the header field can also include a different field, by which the present invention may be non-limited. For example, the length field of the header field can indicate a length of a data field using the number of data octets of a PSDU (physical layer convergence procedure (PLCP) service data units). As shown in FIG. 12, the training length field of the header field can indicate a length of a TRN field. Yet, a length value of the TRN field indicated by the training length field of the header field may have a predetermined limit value. In particular, the training length field may not indicate a TRN field equal to or greater than a prescribed length.

Hence, in case of 11ay system using a plurality of channels, if a TRN length is extended, it may be difficult to indicate all of the TRN length. In this case, it may be able to configure a method of indicating the TRN length for an 11ay STA operating based on the extended TRN length. As an example, signaling is performed by a maximum length of the training field of the L-header and it may be able to signal a longer TRN length by generating a new field such as an extended training length field in EDMG header A for an insufficient length. As a different example, it may be able to signal a longer TRN length by generating a new field such as an extended training length field in EDMG header B. In this case, a header field of a legacy system may be identical to the L-header of the 11ay system. In particular, the 11ay system may include a legacy field identical to a previously defined field in consideration of backward compatibility with a legacy system and may additionally include an EDMG field in consideration of the 11ay system.

In this case, for example, when the legacy system is considered, it is necessary to consider compatibility between an STA to which the 11ay system is applied (hereinafter, 11ay STA) and an STA to which the legacy system is applied (hereinafter, legacy STA). For example, if the legacy STA and the 11ay STA coexist and share a channel space, since the legacy STA is unable to know a TRN length, which is extended more than a value capable of being indicated by a legacy training length field, a problem of failing in protecting a channel transmission period of 11ay may occur.

Hence, it is necessary to newly define values indicated by a length field and a training length field defined in a legacy header field in consideration of the 11ay system and the legacy system. Specifically, the training length field of the legacy header field indicates a TRN length starting from timing at which 11ay PPDU (or legacy PPDU) ends and the length field of the legacy header field may indicate a length resulted from subtracting the TRN length indicated by the training length field from a PPDU length starting from the legacy header field.

Figure 13:
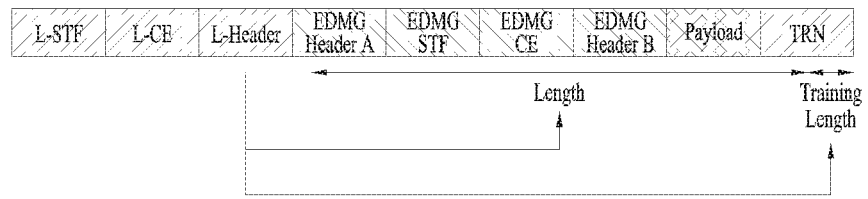
FIG. 13 is a diagram for a method of indicating a length of a TRN field in 11ay system.

More specifically, referring to FIG. 13, the training length of the legacy header field can indicate a TRN length starting from the timing at which a PPDU ends. In particular, the TRN length is inversely indicated from the timing at which the PPDU ends and the length field of the legacy header field can indicate a length resulted from subtracting the TRN length indicated by the training length field from a length of the PPDU. By doing so, a legacy STA is able to know the timing at which the PPDU ends irrespective of the TRN length of the 11ay STA and it is able to prevent a collision of a channel transmission period.

In this case, for example, if a length of a TRN field is longer than a limit length capable of being indicated by the training length field of the legacy header, it is unable to indicate the length of the TRN field using the length field of the legacy training length field only of the legacy header field. However, since the legacy STA is able to know the timing at which the PPDU ends via length field and the training length field of the legacy header field, it may be able to prevent a collision with the 11ay STA in the channel transmission period.

For example, in the aforementioned situation, the 11ay STA can indicate an insufficient TRN field length via an extended training field of the EDMG header A or the EDMG header B. By doing so, it may be able to indicate the TRN field length.

In particular, it is able to secure backward compatibility with the legacy system by configuring an indication value configured in the legacy header field in consideration of a relation between the legacy system and the 11ay system.

4. Method of Operating STA Applicable to the Present Invention

Figure 14:
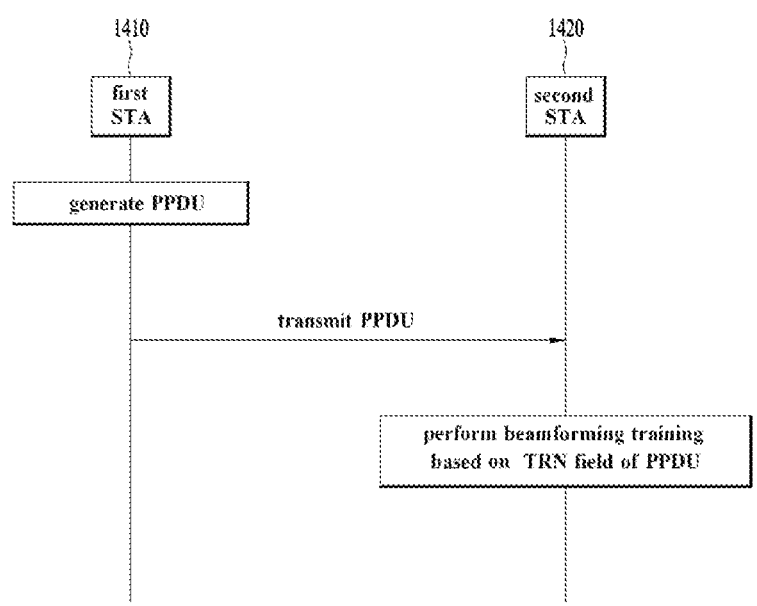
FIG. 14 is a diagram for a method for an STA to transmit a PPDU.

FIG. 14 is a diagram for a method for an STA to transmit a PPDU.

Referring to FIG. 14, a first STA 1410 generates a PPDU and can transmit the generated PPDU to a second STA. In this case, for example, as mentioned in the foregoing description, the first STA 1410 and the second STA 1420 may correspond to an initiator STA and a responder STA, respectively. And, for example, the first STA 1410 and the second STA can perform data transmission using a plurality of channels. For example, the first STA and the second STA can exchange a frame with each other based on such a scheme as channel boding, channel aggregation, or OFDM.

For example, the PPDU transmitted by the first STA 1410 may include the aforementioned TRN field. In this case, the second STA 1420 can perform beamforming training in a period corresponding to the TRN field of the PPDU. In particular, the second STA 1420 can perform beam refinement and beam tracking during the TRN field period, by which the present invention may be non-limited.

In this case, as mentioned in the foregoing description, in case of using a plurality of channels, the TRN field for performing beamforming training can be extended. In particular, in order to perform beamforming, a TRN field of an extended length can be included in a PPDU. In this case, a training length field of a header field was able to indicate a TRN length in a legacy system. Yet, the training length field may have a limit in indicating the TRN length. When a plurality of channels are used, it may be difficult for the training length field to indicate all of an extended TRN field. In this case, the TRN field can be indicated by an extended training length field of EDMG header field as a field for a system that uses a plurality of channels. In this case, since a UE operating based on a legacy system may fail to recognize the extended training length field, a collision may occur in using a channel.

Hence, as mentioned in the foregoing description, it is necessary to change a value indicated by a training length field of L-header of a PPDU in consideration of backward compatibility with a legacy system. In this case, the training length field of L-header can inversely indicate the TRN field length from the timing at which the PPDU ends. And, a length field of L-header can indicate a value resulted from subtracting a TRN field length indicated at the timing at which the PPDU ends after L-header. By doing so, a UE operating in the legacy system can check the timing at which the PPDU ends and it may be able to prevent a collision in using a channel.

Figure 15:
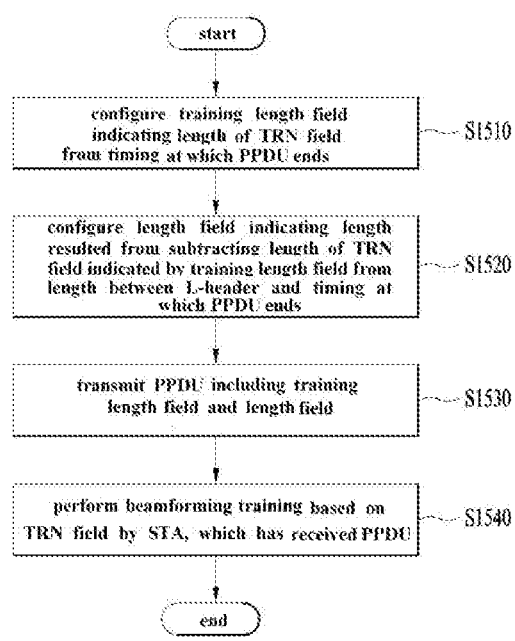
FIG. 15 is a flowchart of a method for an STA to configure field information of a PPDU.

FIG. 15 is a flowchart of a method for an STA to configure field information of a PPDU.

FIG. 15 may correspond to a method of configuring field information in a PPDU based on FIG. 14. In this case, it may be able to configure a training length field indicating a TRN field length from the timing at which a PPDU ends [S1510]. In this case, as mentioned earlier in FIGS. 1 to 14, the training length field may correspond to a field included in L-header for backward compatibility with a legacy system.

In particular, the training length field of L-header can inversely indicate a length of a TRN field from the timing at which a PPDU ends. In this case, it may be able to configure a length field to indicate a length resulted from subtracting the TRN field length indicated by the training length field from a length between L-header and the timing at which the PPDU ends [S1520]. In this case, as mentioned earlier in FIGS. 1 to 14, the length field of L-header can indicate the remaining length of the PPDU in consideration of the TRN field length. By doing so, an STA operating based on the legacy system can avoid a collision in using a channel.

Subsequently, the STA can transmit the PPDU including the training length field and the length field [S1530]. In this case, as mentioned earlier in FIGS. 1 to 14, the training length field and the length field can be included in L-header field of the PPDU for backward compatibility with the legacy system. Subsequently, having received the PPDU, as mentioned earlier in FIGS. 1 to 14, the STA can perform beamforming training based on the TRN field [S1540].

5. Device Configuration

Figure 16:
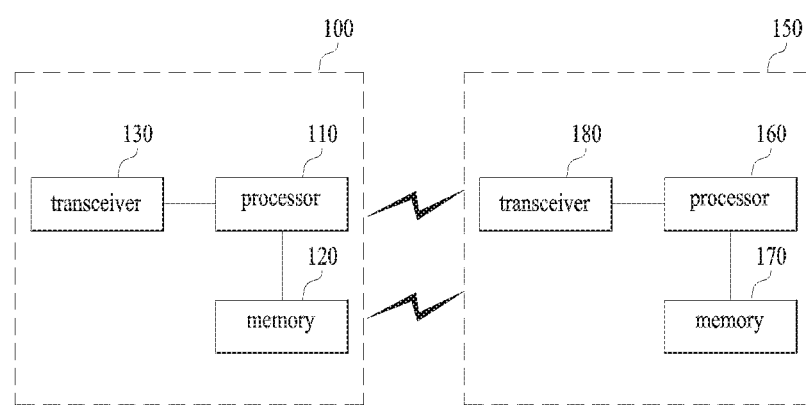
FIG. 16 is a diagram illustrating devices for implementing the above-described method.

FIG. 16 is a diagram illustrating devices for implementing the above-described method.

In FIG. 16, a wireless device 100 may correspond to an STA that transmits a signal using the above-described EDMG Header-A field and a wireless device 150 may correspond to an STA that receives a signal using the above-described EDMG Header-A field. In this case, each of the STAs may be an 11ay user equipment or PCP/AP. Hereinafter, for convenience of description, the signal transmitting STA is referred to as a transmitting device 100 and the signal receiving STA is referred to as a receiving device 150.

The transmission device 100 may include a processor 110, a memory 120 and a transceiver 130. The reception device 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180. The processors 110 and 160 may perform the UL MU scheduling procedure described above.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting and receiving a signal by a station (STA) in a wireless communication system, the method comprising:
   receiving a physical protocol data unit (PPDU); and
   performing beamforming training based on a training (TRN) field of the PPDU,
   wherein the PPDU further includes a legacy header (L-header) field, an enhanced directional multi-gigabit (EDMG) header field and a data field,
   wherein a first length field included in the L-header field includes information on a length of the TRN field,
   wherein the length of the TRN field is obtained from the end of the PPDU, and
   wherein a second length field included in the L-header field includes information on a length of the data field,
   wherein the length of the data field is obtained by subtracting the length of the TRN field from a length of the PPDU after the L-header field,
   wherein the EDMG header field includes a third length field, and
   wherein when the length of the TRN field is longer than a predetermined limit on the length of the TRN field, the first length field includes information that reflects the predetermined limit on the length of the TRN field, and the third length field includes information that reflects a remaining length of the TRN field.

2. The method of claim 1, wherein the STA relates to an STA operating based on a first system only.

3. The method of claim 2, wherein the PPDU further comprises an enhanced directional multi-gigabit EDMG header field.

4. The method of claim 3, wherein the third length field is an extended training length field included in the EDMG header field.

5. The method of claim 4, wherein the remaining length of the TRN field is obtained inversely from the end of the PPDU.

6. The method of claim 3, wherein the EDMG header field relates to a field including information related to the first system, and
   wherein the L-header field relates to a field including information related to a legacy system.

7. The method of claim 6, wherein the first system relates to an IEEE 802.1 lay system.

8. A station (STA) transmitting and receiving a signal in a wireless communication system, comprising:
   a transceiver having one or more radio frequency (RF) chains, and
   a processor configured to control the transceiver,
   wherein the processor is further configured to:
   control the transceiver to receive a physical protocol data unit (PPDU), and
   perform beamforming training based on a training (TRN) field of the PPDU, wherein the PPDU further includes a legacy header (L-header) field, an enhanced directional multi-gigabit (EDMG) header field and a data field, wherein a first length field included in the L-header field includes information on a length of the TRN field, wherein the length of the TRN field is obtained from the end of the PPDU, and wherein a second length field included in the L-header field of the PPDU indicates includes information on a length of the data field, wherein the length of the data field is obtained by subtracting the length of the TRN field from a length of the PPDU after the L-header field, wherein the EDMG header field includes a third length field, and wherein when the length of the TRN field is longer than a predetermined limit on the length of the TRN field, the first length field includes information that reflects the predetermined limit on the length of the TRN field, and the third length field includes information that reflects a remaining length of the TRN field.

9. The STA of claim 8, wherein the STA relates to an STA operating based on a first system only.

10. The STA of claim 9, wherein the PPDU further comprises an enhanced directional multi-gigabit (EDMG) header field.

11. The STA of claim 10, wherein the third length field is an extended training length field included in the EDMG header field.

12. The STA of claim 11, wherein the remaining length of the TRN field is obtained inversely from the end of the PPDU.

13. The STA of claim 10, wherein the EDMG header field relates to a field including information based on the first system, and wherein the L-header field relates to a field including information based on a legacy system.

* * * * *